United States Patent
Baniel et al.

(10) Patent No.: US 8,163,092 B2
(45) Date of Patent: Apr. 24, 2012

(54) METHOD OF CONCENTRATING HYDROCHLORIC ACID

(75) Inventors: Avraham Baniel, Jerusalem (IL); Robert Jansen, Portela (PT)

(73) Assignee: HCL Cleantech Ltd., Tel-Aviv (IL)

( * ) Notice: Subject to any disclaimer, the term of this patent is extended or adjusted under 35 U.S.C. 154(b) by 331 days.

(21) Appl. No.: 12/426,308

(22) Filed: Apr. 20, 2009

(65) Prior Publication Data

US 2010/0264372 A1 Oct. 21, 2010

(51) Int. Cl.
*C01B 7/07* (2006.01)

(52) U.S. Cl. ....... 127/46.1; 423/481; 423/488; 122/31.1

(58) Field of Classification Search ............ 423/481, 423/488; 127/46.1; 122/31.1
See application file for complete search history.

(56) References Cited

U.S. PATENT DOCUMENTS

| | | | | |
|---|---|---|---|---|
| 1,678,819 A | * | 7/1928 | Koch | 127/46.1 |
| 3,131,027 A | | 4/1964 | Borkowski | |
| 3,939,803 A | * | 2/1976 | Meissner et al. | 122/31.1 |
| 4,237,110 A | * | 12/1980 | Forster et al. | 423/488 |
| 4,579,595 A | | 4/1986 | Sachetto | |
| 4,890,820 A | * | 1/1990 | Tucker | 266/107 |
| 5,398,497 A | * | 3/1995 | Suppes | 60/775 |
| 5,635,152 A | | 6/1997 | Walpole | |
| 5,846,510 A | | 12/1998 | Hollitt | |
| 6,521,097 B2 | | 2/2003 | Geissler | |
| 6,942,803 B2 | | 9/2005 | Cockrem | |

FOREIGN PATENT DOCUMENTS

| | | |
|---|---|---|
| WO | WO2008/111045 | 9/2008 |
| WO | WO 2008111045 A1 * | 9/2008 |

OTHER PUBLICATIONS

International Search Report for PCT/IL2010/000317 (mailed Sep. 14, 2010).
International Search Written Opinion for PCT/IL2010/000317 (mailed Sep. 14, 2010).

* cited by examiner

*Primary Examiner* — Ngoc-Yen Nguyen

(57) ABSTRACT

A method for producing concentrated HCl vapor from an aqueous solution of HCl, including: (a) introducing an aqueous feed liquor to an evaporation chamber containing a mother liquor, the feed liquor having an initial, super-azeotropic HCl concentration; (b) directly contacting a liquor of these liquors with a heat-laden heat transfer fluid, to transfer heat from the fluid; (c) utilizing the heat to evaporate HCl, within the chamber, to produce the concentrated HCl vapor and to produce the mother liquor, the mother liquor including an aqueous phase having a reduced concentration of HCl, with respect to the initial HCl concentration; (d) subjecting the mother liquor to a liquid-liquid separation to produce a liquid phase containing HCl, and another liquid phase containing the heat transfer fluid in a heat-depleted state, with respect to the heat transfer fluid in step (b); (e) heating the heat transfer fluid in the heat-depleted state, to regenerate the heat-laden heat transfer fluid, and (f) returning this heat transfer fluid to step (b).

15 Claims, 3 Drawing Sheets

METHOD OF CONCENTRATING HYDROCHLORIC ACID

FIELD AND BACKGROUND OF THE INVENTION

The present invention relates to the production of concentrated HCl vapors, and, more particularly, to a method of producing concentrated HCl vapors from super-azeotropic solutions by means of direct heating.

Various technologies are known for producing concentrated HCl vapors from super-azeotropic solutions of HCl, including:
concentration by varying the operating pressure, and
concentration by extractive rectification (i.e., adding an extractive agent).

With regard to processes utilizing a varying operating pressure, the concentration of HCl at the azeotrope point is known to depend on the operating pressure. Therefore, it is possible to concentrate the HCl by operating distinct stages employing two different pressures. The feed mixture is first subjected to low pressure to produce a mixture having an azeotropic composition. The mixture is then subjected to a higher pressure in a second stage. While a substantially azeotropic mixture is obtained in the second column, the aqueous HCl concentration is lower than the azeotropic composition of the first stage due to the higher operating pressure. Thus, the liquor from the second column may be recycled to the first column. Concentrated hydrochloric acid may be removed in the vapor phase from the second column.

In concentration by means of extractive rectification, the azeotrope point is suppressed by an extractive agent, so as to increase the relative volatility of the HCl. The extractive agent may be strongly hygroscopic. Hydrochloric acid of high concentration or HCl gas may be produced at the head of the extractive rectification column. Upon being introduced to an extraction column, the extraction agent extracts, and becomes diluted with, water from the HCl feed stream. Outside of the column, the extractive agent is reconcentrated and recycled to the extraction column.

The above-described processes notwithstanding, it is believed that there is a need for further improvements in methods and systems for producing concentrated HCl vapors from solution, and the subject matter of the present disclosure and claims is aimed at fulfilling this need.

SUMMARY OF THE INVENTION

According to the teachings of the present invention there is provided a method for producing a concentrated HCl vapor from a super-azeotropic, aqueous solution of HCl, the method including the steps of: (a) introducing an aqueous feed liquor to an evaporation chamber containing a mother liquor, the aqueous feed liquor having an HCl concentration of at least 18%, by weight, the concentration defined by a relationship:

$$C_{liq}=100 \cdot A/(A+W)$$

wherein $C_{liq}$ is the concentration by weight, expressed in %; A is a weight percent of HCl in the aqueous liquor, and W is a weight percent of water in the aqueous liquor; (b) directly contacting a liquor of these liquors with a heat-laden heat transfer fluid, to transfer heat from the fluid; (c) utilizing the heat to evaporate HCl, within the chamber, to produce the concentrated HCl vapor and to produce the mother liquor, the mother liquor including an aqueous phase having a reduced concentration of HCl, with respect to the HCl concentration; (d) subjecting the mother liquor to a liquid-liquid separation to produce a first, aqueous, liquid phase containing HCl, and a second liquid phase containing the heat transfer fluid in a heat-depleted state, with respect to the heat transfer fluid in step (b); (e) heating the heat transfer fluid in the heat-depleted state, to regenerate the heat-laden heat transfer fluid, and (f) returning the heat transfer fluid in the heat-laden state to step (b).

According to another aspect of the present invention there is provided a method for producing a concentrated HCl vapor from a super-azeotropic, aqueous solution of HCl, the method including the steps of: (a) introducing an aqueous feed liquor to an evaporation chamber containing a mother liquor, the aqueous feed liquor containing at least 10% sugar on a weight basis of sugar within the feed liquor to sugar and water within the feed liquor, and having an HCl concentration of at least 18%, by weight, the concentration defined by a relationship:

$$C_{liq}=100 \cdot A/(A+W)$$

wherein $C_{liq}$ is the concentration by weight, expressed in %; A is a weight percent of HCl in the aqueous liquor, and W is a weight percent of water in the aqueous liquor; (b) directly contacting a liquor of these liquors with a heat-laden heat transfer fluid, to transfer heat from the fluid; (c) utilizing the heat to evaporate HCl, within the chamber, to produce the concentrated HCl vapor and to produce the mother liquor, the mother liquor including an aqueous phase containing at least 10% sugar on a weight basis of sugar within the aqueous phase to sugar and water within the aqueous phase, and having a reduced concentration of HCl, with respect to the HCl concentration; (d) subjecting the mother liquor to a liquid-liquid separation to produce a first, aqueous, liquid phase containing HCl, and a second liquid phase containing the heat transfer fluid in a heat-depleted state, with respect to the heat transfer fluid in step (b); (e) heating the heat transfer fluid in the heat-depleted state, to regenerate the heat-laden heat transfer fluid, and (f) returning the heat transfer fluid in the heat-laden state to step (b).

According to further features in the described preferred embodiments, the contacting of the heat-laden heat transfer fluid with the liquor of the liquors transpires outside the evaporation chamber.

According to still further features in the described preferred embodiments, associated with the evaporation chamber is a feed loop, having a first end and a second end disposed in fluid communication with the evaporation chamber, and wherein the mother liquor is circulated through the loop as a circulated mother liquor.

According to still further features in the described preferred embodiments, the heat-laden heat transfer fluid is introduced to the evaporation chamber via the loop.

According to still further features in the described preferred embodiments, the contacting transpires in the loop.

According to still further features in the described preferred embodiments, the aqueous feed liquor is introduced to the evaporation chamber via the loop.

According to still further features in the described preferred embodiments, the heat-laden heat transfer fluid includes a gas, and the heat includes latent heat from the gas.

According to still further features in the described preferred embodiments, the heat-laden heat transfer fluid includes a liquid heat transfer fluid, and the heat includes sensible heat from the liquid heat transfer fluid.

According to still further features in the described preferred embodiments, the heat-laden heat transfer fluid includes at least one mineral oil in which at least 85% of the hydrocarbons, by weight, are within a range of 10 and 18 carbon atoms.

According to still further features in the described preferred embodiments, the heat-laden heat transfer fluid includes at least one mineral oil selected from the group consisting of alkane, cyclo-alkane, and aromatic mineral oils.

According to still further features in the described preferred embodiments, the method further includes controlling a ratio of a flowrate of the circulated mother liquor to a flowrate of the heat-laden heat transfer fluid within a pre-determined range.

According to still further features in the described preferred embodiments, the method further includes controlling a ratio of a thermal mass of the circulated mother liquor to a thermal mass of the heat-laden heat transfer fluid within a pre-determined range.

According to still further features in the described preferred embodiments, that thermal mass ratio is controlled to maintain a temperature within the loop below a pre-determined value.

According to still further features in the described preferred embodiments, that pre-determined value is 110° C., 90° C., 75° C., 70° C., 65° C., or 60° C.

According to still further features in the described preferred embodiments, the method further includes controlling a ratio of a flowrate of the circulated mother liquor to a flowrate of the heat-laden heat transfer fluid to maintain a temperature within the loop below a pre-determined value.

According to still further features in the described preferred embodiments, the aqueous, liquid phase contains at least 10% or 12% sugar on a weight basis of sugar to sugar and water within the aqueous, liquid phase.

According to still further features in the described preferred embodiments, an HCl concentration in the vapor, by weight, is at least 35%, the HCl concentration in the vapor defined by a relationship:

$$C_{vap}=100 \cdot A/(A+W)$$

wherein: $C_{vap}$ is the HCl concentration in the vapor, by weight, expressed in %; A is a weight percent of HCl in the vapor, and W is a weight percent of water vapor in the vapor.

According to still further features in the described preferred embodiments, the method further includes scrubbing the concentrated HCl vapor to produce a substantially dry HCl vapor. Preferably, the vapor contains less than 200 ppm water, less than 50 ppm water, less than 20 ppm water, or less than 10 ppm water.

According to still further features in the described preferred embodiments, the method further includes processing the aqueous phase to produce a sugar solution containing less than 2% HCl, less than 1% HCl, less than 0.5% HCl, or less than 0.1% HCl.

According to still further features in the described preferred embodiments, the method further includes neutralizing an HCl content in the second liquid phase.

According to still further features in the described preferred embodiments, the method further includes controlling a ratio of a flowrate of the circulated mother liquor to a flowrate of the heat-laden heat transfer fluid to maintain a temperature within the loop below 110° C., below 90° C., below 75° C., below 70° C., below 65° C., or below 60° C.

According to still further features in the described preferred embodiments, the temperature of the heat-laden heat transfer fluid exceeds 75° C., 80° C., 85° C., 100° C., 120° C., or 130° C.

According to still further features in the described preferred embodiments, the temperature within the evaporation chamber is maintained below 75° C., and in some instances, below 65° C., below 55° C., below 50° C., or below 45° C.

BRIEF DESCRIPTION OF THE DRAWINGS

The invention is herein described, by way of example only, with reference to the accompanying drawings. With specific reference now to the drawings in detail, it is stressed that the particulars shown are by way of example and for purposes of illustrative discussion of the preferred embodiments of the present invention only, and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice. Throughout the drawings, like-referenced characters are used to designate like elements.

In the drawings.

DESCRIPTION OF THE PREFERRED EMBODIMENTS

The principles and operation of the system for, and method of, producing concentrated HCl vapors from super-azeotropic solutions according to the present invention may be better understood with reference to the drawings and the accompanying description.

Before explaining at least one embodiment of the invention in detail, it is to be understood that the invention is not limited in its application to the details of construction and the arrangement of the components set forth in the following description or illustrated in the drawings. The invention is capable of other embodiments or of being practiced or carried out in various ways. Also, it is to be understood that the phraseology and terminology employed herein is for the purpose of description and should not be regarded as limiting.

Figure 1:
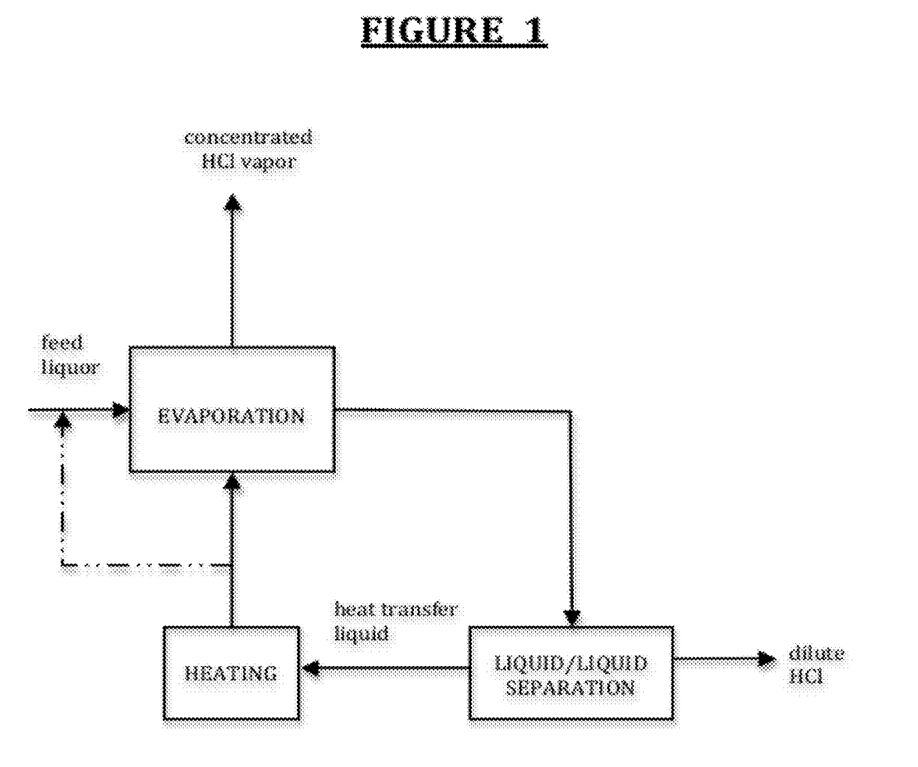
FIG. 1 is a schematic process diagram of a method of concentrating super-azeotropic HCl vapor from a feed stream containing super-azeotropic HCl, according to one aspect of the present invention.

Referring now to the drawings, FIG. 1 is a schematic process diagram of a process for concentrating super-azeotropic HCl vapor from a feed stream or liquor containing super-azeotropic HCl, according to one aspect of the present invention. In an evaporation stage, the latent heat of evaporation is supplied to a concentrated, super-azeotropic solution containing at least 12%, more typically, at least 18%, and most typically, 20% to 22% by weight HCl, to produce a concentrated HCl vapor containing a higher concentration of HCl with respect to the liquid phase. The latent heat of evaporation is provided by direct heat transfer, i.e., by adding a heat-laden heat transfer medium or fluid to directly contact the liquor to be subjected to evaporation.

The heat may be supplied directly to the evaporation stage. Alternatively, the heat may be supplied to the concentrated, super-azeotropic solution outside the evaporation stage. In this case, hydrostatic pressure on the heated solution may be used to prevent boiling outside the evaporation chamber. Upon introduction to the evaporation or flash chamber, the heated solution is exposed to the sub-atmospheric pressure of the chamber, and flash-evaporation of concentrated HCl vapor ensues.

The concentrated HCl vapor thus obtained may be removed as a product, or used elsewhere in the process. The liquor from the evaporation stage is subsequently subjected to a liquid-liquid separation, to produce an aqueous phase containing diluted HCl, and a second liquid phase containing the heat transfer fluid in a heat-depleted state. Preferably, the heat transfer fluid is immiscible or substantially immiscible in the aqueous phase.

The heat transfer fluid is heated to produce a heated heat transfer fluid, which may be then provided to the evaporation stage. The heated heat transfer fluid may include a liquid and/or a vapor. In a first exemplary heat transfer mechanism, the heat transfer fluid may be heated to produce a vapor. The heat of condensation (latent heat) of the vapor, and possibly some sensible heat, is directly absorbed by the HCl-containing liquor to produce the concentrated HCl vapor, thereby obviating the need for inefficient, capital-intensive (indirect) surface heat exchange.

In a second exemplary heat transfer mechanism, the heat transfer fluid may be heated to produce a heat-laden liquid at a temperature exceeding the temperature in the evaporation stage. The sensible heat of the heat transfer fluid is directly absorbed by the HCl-containing liquor to produce the concentrated HCl vapor, thereby obviating the need for indirect surface heat exchange.

The heat transfer fluid is preferably a liquid at the operating temperature of the evaporation stage, and is preferably chemically inert or substantially inert with respect to the HCl. With regard to the second exemplary heat transfer mechanism, the heat transfer fluid preferably has a boiling point—at the operating conditions (temperature, total pressure, partial pressures of components) of the evaporation stage—of at least 20° C. and more typically at least 100° C. or at least 150° C. above the temperature in the evaporation stage.

In absolute terms, the boiling point of the heat transfer fluid in a pure state, at atmospheric pressure, may preferably be at least 100° C., at least 200° C., or at least 250° C. The vapor pressure of the heat transfer fluid may be less than 1 mm Hg at 40° C. or at the operating temperature of the evaporator.

The heat transfer fluid may include, or consists essentially of, at least one hydrocarbon having a carbon length in a range of 8 to 18 (C8-C18), or a mixture of hydrocarbons in which at least 95%, by weight, falls into this range. For systems in which sensible heat is the main heat transfer mechanism, the at least one hydrocarbon typically has a carbon length in a range of C10-C18, C12-C18, or a mixture of hydrocarbons in which at least 85% or at least 95%, by weight, falls into these ranges.

In one preferred embodiment, the at least one hydrocarbon includes, or consists essentially of, at least one mineral oil. Exemplary mineral oils include tridecanes, tetradecanes, and pentadecanes such as n-tridecane, n-tetradecane, and n-pentadecane. Exemplary mineral oils may also include various naphthenic oils based on cycloalkanes (naphthenes). Exemplary mineral oils may also include various aromatic oils.

Generally, the heat transfer fluid should preferably satisfy various physical and chemical criteria, including:
 substantially chemically inert to concentrated aqueous solutions having an HCl content of at least 20%, by weight;
 solubility of HCl in the heat transfer fluid: less than 0.5%, preferably less than 0.1%, more preferably less than 0.05%;
 substantially immiscible with water: less than 0.5%, preferably less than 0.1%, more preferably less than 0.05%;
 viscosity of the pure liquid heat transfer fluid, at the operating temperature of the evaporator, is less than 50 centipoises (cp), preferably less than 25 cp, more preferably less than 15 cp, yet more preferably, less than 10 cp.

Figure 2:
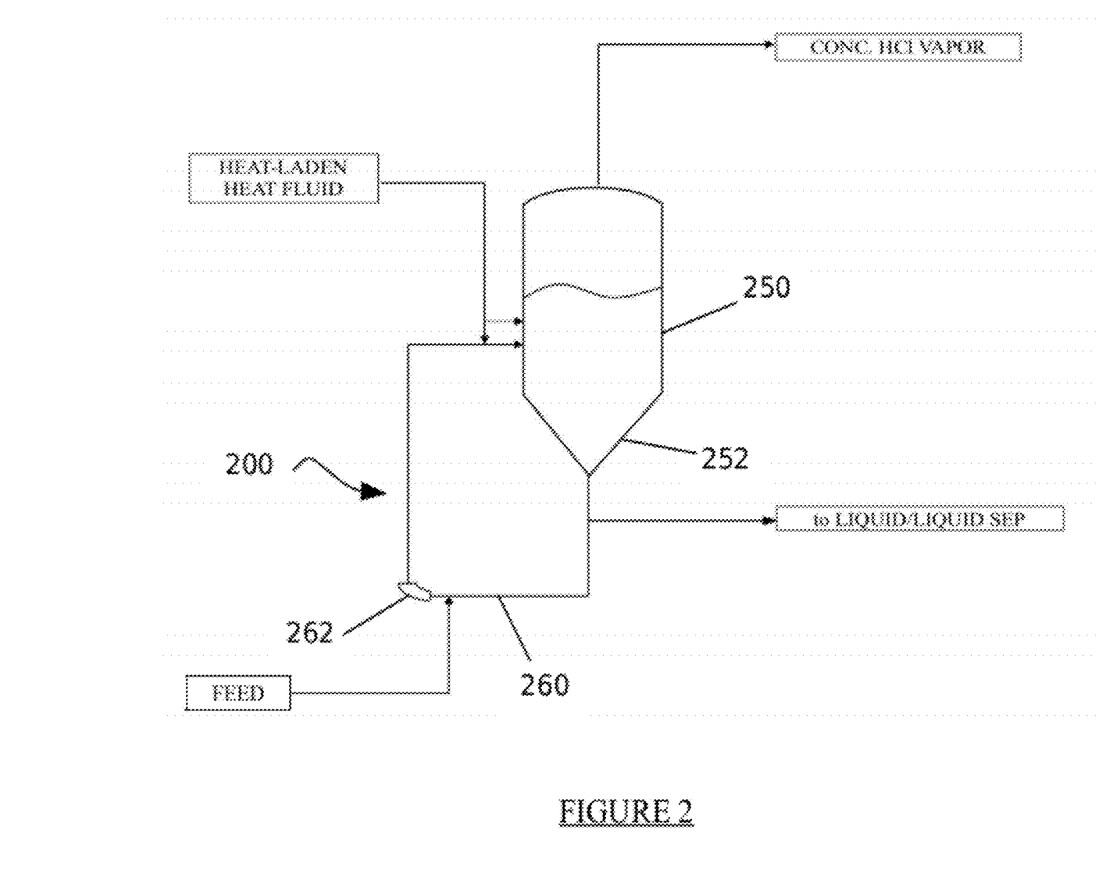
FIG. 2 is a schematic diagram of an HCl evaporation system for concentrating super-azeotropic HCl vapor from a feed stream containing super-azeotropic HCl, according to another aspect of the present invention.

FIG. 2 is an exemplary, schematic diagram of an HCl evaporation system 200 for concentrating super-azeotropic HCl vapor from a feed stream containing super-azeotropic HCl, according to another aspect of the present invention. HCl evaporation system 200 may advantageously include at least one evaporation chamber or evaporator 250 and a circulation or feed loop 260 through which all or at least a portion of the heat-laden heat transfer fluid may advantageously be introduced into evaporator 250. Feed loop 260 may fluidly communicate with the volume within evaporator 250 in at least two locations. For example, feed loop 260 may be connected, at a first end, to or near a bottom section 252 of evaporator 250, and at a second end, to a side wall of evaporator 250. In the exemplary diagram provided in FIG. 2, feed loop 260 is connected, at a first end, to bottom section 252, which is of a generally conical form (e.g., a truncated cone). The inlet through the side wall of evaporator 250 may be of a tangential design, to improve the mixing characteristics within evaporator 250, and to reduce deleterious spraying.

Mother liquor from evaporator 250 may be circulated through feed loop 260 by means of a circulation pump 262.

At least a portion of the heat-laden heat transfer fluid may be introduced directly into evaporator 250. The product liquor may be withdrawn from evaporation system 200 directly from evaporator 250, or, as shown, via feed loop 260. Similarly, the feed containing the HCl solution may be introduced directly to evaporator 250, or, as shown, via feed loop 260.

The vacuum within evaporator 250 may be controlled within a particular pressure range, which, for a particular solution composition, may correspond to a particular temperature range.

We have found that locally-high temperatures may greatly accelerate corrosion of various process equipment. Moreover, in many processes, high temperatures or locally-high temperatures may degrade materials in the mother liquor. However, by introducing the heat-laden heat transfer fluid to evaporation system 200 via feed loop 260, we have found that mixing of the fluid with the circulating mother liquor may be utilized to control local temperatures below a target value. This configuration also enables heating of the heat-laden heat transfer fluid to appreciably higher temperatures, without risking local temperatures rising above or overshooting a target value.

Consider, by way of example, an aqueous hydrolyzate solution containing C5 and C6 sugars in a highly acidic solution containing approximately 40% HCl on a weight basis of HCl to HCl and water (A/(A+W)). The HCl may be concentrated in the vapor phase by evaporation, and the concentrated HCl vapor may then be returned to the hydrolysis stage. It may be highly preferable to maintain the solution temperature below about 70° C., to avoid, or at least largely inhibit degradation of the sugars.

Even if evaporator 250 is operated at 40-50° C., the introduction of a heat-laden heat transfer fluid directly into evaporator 250 may limit the temperature of the heat transfer fluid to 70-75° C., to avoid sugar degradation due to high local temperatures. According to the above-described embodiment of the present invention, however, the heat-laden heat transfer fluid is introduced to evaporation system 200 via feed loop 260. The temperature in feed loop 260 is controlled by controlling, within a particular range, or above a particular value, a thermal mass ratio of the flow of mother liquor circulating in loop 260 to the flow of the heat-laden heat transfer fluid introduced to loop 260. Thus, the temperature of the heat transfer fluid may be elevated to at least 10° C., at least 20° C., at least 30° C., or at least 50° C. or 60° C. above the degradation temperature or target temperature of the mother liquor in evaporator 250.

Typically, feed loop 260 may be operated such that the thermal mass of the flow of mother liquor circulating in loop 260 is within a range of 1 to 10 times the thermal mass of the heat-laden heat transfer fluid being introduced to loop 260.

The materials of construction of the inside surfaces of evaporator 250 must be suitable for handling HCl solutions. However, these materials of construction may be thermally insulative. In addition, the temperature of the internal walls of evaporator 250 is typically substantially identical to the operating temperature of evaporator 250.

Figure 3:
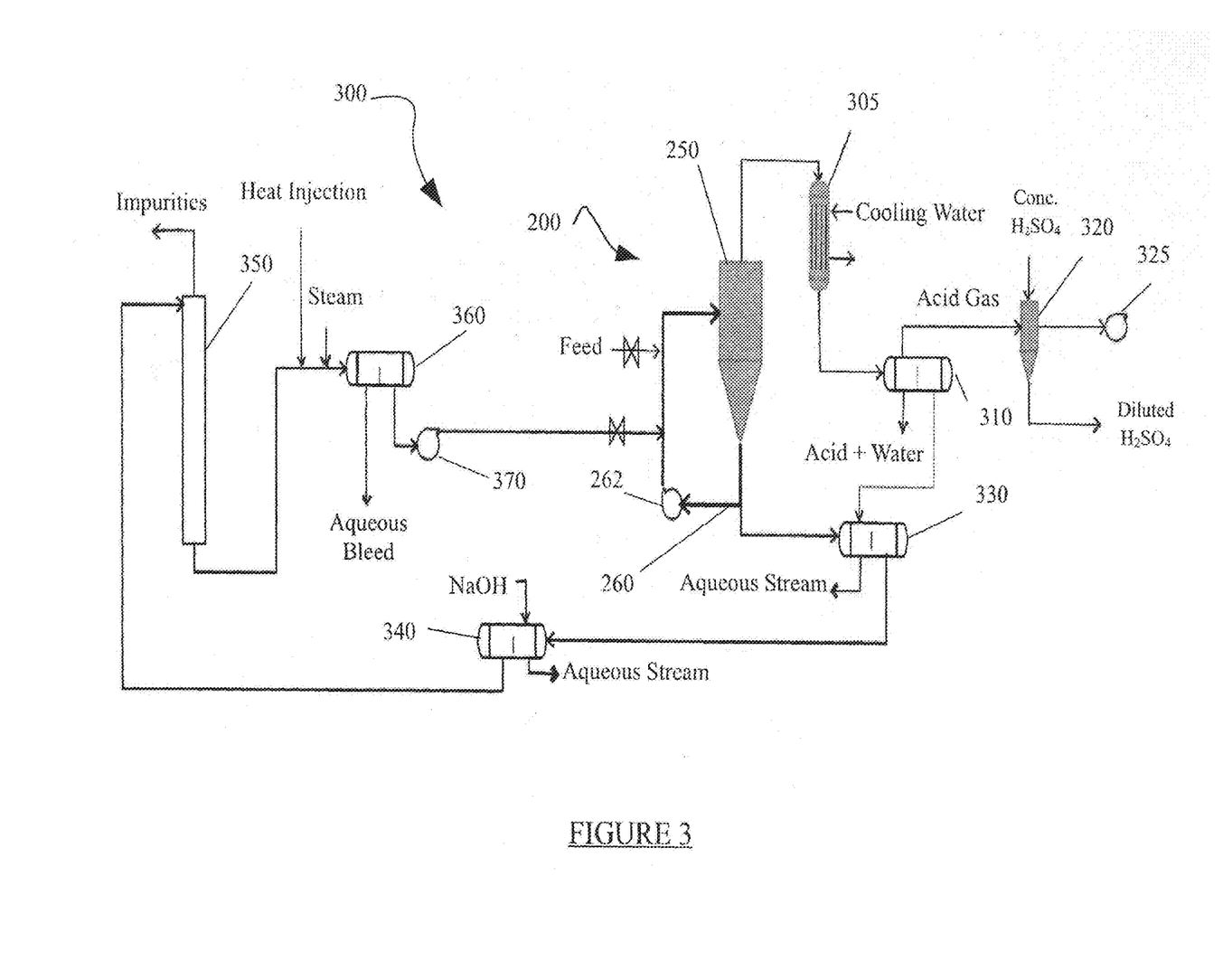
FIG. 3 is a schematic process diagram of a system and process for concentrating super-azeotropic HCl vapor from a feed solution containing super-azeotropic HCl, according to a preferred embodiment of the present invention.

Referring now to FIG. 3, FIG. 3 is a schematic process diagram of a system 300 and process for concentrating super-azeotropic HCl vapor from a feed solution containing super-azeotropic HCl, according to a preferred embodiment of the present invention. System 300 includes evaporation system 200, and may further include decanters 310, 330, 340, 360, a condenser such as surface condenser 305, a scrubbing system 320, a compressor 325, a distillation column 350, and a pump 370.

The heat source for providing the heat of evaporation may include a plurality of heat sources that may have different levels of heat quality. Waste heat, such as dryer exhaust gases, evaporator vapors, etc., may be advantageously utilized. When different levels of heat quality are being employed, it may be beneficial to arrange the heat sources in a countercurrent fashion with respect to the flow of the heat-transfer fluid, such that the coldest heat source contacts the heat-transfer fluid in its coldest state, and the hottest heat source contacts the heat-transfer fluid in its hottest state. Steam may be introduced to control the final temperature of the heat-transfer fluid. Typically, steam would be used as the final heat source, so as to utilize waste heat and lower-cost heat sources to whatever degree possible.

Both direct and indirect (surface) heat transfer may be used to heat the heat-transfer fluid. In the event that direct heat transfer is used, and water or an aqueous phase is present in the heat source, decanter 360 may be used to separate water or an aqueous phase from the heated heat-transfer fluid.

Pump 370 may supply the motive power and may be selected to hold a back pressure, to insure that all components in the stream are liquid prior to flashing in evaporation system 200.

A feed stream, containing a super-azeotropic, aqueous solution of HCl, is fed into the flash evaporation system. A heat-laden heat transfer fluid is added to evaporation system 200 so as to directly contact an aqueous solution of HCl within the system, thereby supplying the requisite heat to evaporate, preferably in the flash evaporator, a vapor containing concentrated HCl. The heat-depleted heat transfer fluid is typically a liquid, and preferably immiscible or substantially immiscible in the aqueous phase in the flash evaporator. The mother liquor or liquid stream withdrawn from the system typically contains at least two phases: an aqueous phase typically containing a near-azeotropic concentration of HCl, and an organic phase containing the heat-depleted heat transfer liquid. This liquid stream is subsequently subjected to a liquid/liquid separation, e.g., by means of decanter 330. The separated aqueous phase may undergo further treatment downstream, while the separated organic phase may be heated to produce the heat-laden heat transfer fluid, which may then be recycled to evaporation system 200.

The product vapor containing concentrated HCl is discharged from evaporator 250 via surface condenser 305, which may serve to condense water and any solvent disposed in the product vapor. At 5° C., the pressure may be about 35 millibar absolute, such that the equilibrium concentration of HCl in the condensate may exceed 20% by weight.

In another possible arrangement, a condenser may be used on the product vapor at a somewhat higher temperature (e.g., between 30° C. and 40° C.), to condense most of the water and achieve an acid concentration of approximately 28%. In a subsequent condensation stage, performed at a lower temperature (e.g., around 5° C.), the remaining water would contain a lower concentration of HCl (e.g., around 13-15%). Non-condensable gases may be exhausted with the HCl gas after the compressor.

The partially condensed stream leaving surface condenser 305 may then be subjected to a separation step, e.g., in decanter 310, to separate off water and dissolved acid from the vapor phase, which may contain predominantly HCl gas. The gas may be passed through scrubbing system 320, where the HCl gas may be dried, substantially completely. To this end, concentrated sulfuric acid (e.g., ~98% by weight) may be used as the scrubbing fluid.

Compressor 325 may be used to maintain the vacuum on the system and to discharges the HCl gas at atmospheric pressure for sale or for reuse in the process. If scrubbing system 320 is operated to produce a substantially dry HCl gas, the materials of construction downstream of compressor 325 may be standard, low cost materials.

The separated organic phase containing the heat-depleted heat transfer liquid may undergo treatment and/or purification in a treatment system 375 before being recycled to evaporation system 200. By way of example, this separated organic phase may be treated to remove various impurities, e.g., by means of distillation column 350. Should the impurities be light boilers such as terpenes, clean solvent may be withdrawn from the bottom, as shown. In the event that the impurities are high boilers, such as waxes and gums, the clean solvent may be removed from the top of column 350, as a vapor.

Prior to the distillation step, the separated organic phase may be treated to remove even trace quantities of HCl dissolved in the solvent stream. For various mineral oils such as n-tetradecane, the level of dissolved HCl may be on the order of 200-500 ppm. By way of example, the separated organic phase may be contacted by a stream containing a base such as sodium hydroxide, in a vessel such as decanter 340. The pH is preferably controlled to achieve a slightly basic value.

The heavy, aqueous phase is separated off from the neutralized organic phase, which may then be directed to distillation column 350. This neutralization step may advantageously allow the selection of relatively inexpensive construction materials for downstream operations until evaporation system 200, where HCl-loaded feed is introduced to the loop.

When extractants are utilized to recover HCl from the aqueous phase (containing dilute HCl), the hydrocarbon(s) selected for the heat transfer fluid may advantageously be selected from the components of the acid recovery extractant, or to be compatible with those components.

A portion of the cooled heat transfer fluid may be bled from the system. For example, this portion or bleed stream may be periodically or continuously treated (e.g., by distillation) to remove "extractives" or other impurities whose concentration might otherwise build up in the loop. The flowrate of the bleed stream may be chosen to maintain a pre-determined or low level of such extractives in the circulating solvent loop.

The rest of the recovered heat transfer fluid is then heated and returned to the evaporation stage, such that a continuous evaporation cycle may be provided.

EXAMPLES

Reference is now made to the following example, which together with the above description, illustrates the invention in a non-limiting fashion.

Example 1

A hydrolyzate stream containing aqueous HCl may be treated according to the present invention, to concentrate HCl in the vapor phase. In the hydrolysis of biomass, biomass is attacked by concentrated HCl (39-43%, by weight), at low temperature, producing the hydrolyzate stream containing C5 and C6 sugars and oligomers in an aqueous hydrochloric acid solution. The process also yields a lignin by-product.

The hydrolyzate stream typically contains approximately 25-40% sugars on a weight basis of sugar to sugar and water (S/(S+W)) and 35-42% HCl on a weight basis of HCl to HCl and water (A/(A+W)). Evaporation may be used to concentrate the HCl, which may then be returned to the hydrolysis stage.

As mentioned hereinabove, HCl forms an azeotrope with water at a concentration of approximately 22%, by weight, depending on the pressure. One preferred approach is to recover concentrated HCl from the super-azeotropic solution by evaporating off HCl until the concentration of HCl in solution approaches the azeotropic point. Other processes may be used to recover the remaining acid from the sugar-rich aqueous stream.

The evaporation of HCl may preferably be effected at a pressure of approximately 25-60 millibar absolute and a temperature in the range of 35° C.-70° C. Above about 70° C., the dissolved sugars may undergo degradation.

Even at these relatively low temperatures, HCl may be highly corrosive. Conventional HCl evaporation systems use surface heat exchangers manufactured from graphite or from exotic metals (e.g., tantalum, zirconium), both of which are extremely expensive.

However, according to the method of the present invention, the evaporation of super-azeotropic HCl is effected by direct heating of the solution, obviating the need to heat the solution by (indirect) surface heat exchange. A direct heat transfer fluid such as a water-immiscible, high-boiling point hydrocarbon having a carbon length of C10-C18 is preferably used to provide the requisite heat for evaporating the HCl to the azeotropic point. When the heat-laden heat transfer fluid is a liquid, and the main heat transfer mechanism is direct transfer of sensible heat, the hydrocarbon or hydrocarbon mixture may preferably have a carbon length of C13-C18.

As described hereinabove, the temperature of the heat transfer fluid may be elevated to at least 10° C., at least 20° C., at least 30° C., or at least 50° C. or 60° C. above the degradation temperature or target temperature of the mother liquor in evaporator 250. In the case of a hydrolyzate stream containing C5 and C6 sugars in an aqueous hydrochloric acid solution, the temperature of the heat transfer fluid may be elevated to at least 75° C., at least 80° C., at least 85° C., at least 100° C., at least 120° C., or at least 130° C., even though the degradation temperature may be approximately 70° C.

The pressure in the flash evaporator may preferably be maintained within a pressure range of 25-45 millibar absolute and within a temperature range of 35-60° C.

The vapor exiting the flash chamber typically contains at least 35% HCl, on a weight basis of HCl to HCl and water (A/(A+W)), and more typically, has an HCl content within a range of 35-50%, on that basis. The liquid stream exiting the flash chamber contains the heat-depleted heat transfer liquid, the hydrolyzate products, and HCl at a concentration that may approach the azeotropic concentration. The temperature of the liquid stream is substantially that of the flashing temperature. The liquid stream is subsequently decanted to separate the liquid phase containing the immiscible heat transfer fluid from the aqueous phase containing the sugar and relatively dilute HCl.

Utilizing the solvent extraction technologies taught by PCT Patent Publication No. WO2008111045, entitled "A Process for the Recovery of HCl from a Dilute Solution Thereof", or possibly utilizing other means known to those of ordinary skill in the art, the aqueous phase may subsequently be processed to produce a concentrated sugar solution containing less than 1% HCl, less than 0.5% HCl, or less than 0.1% HCl. PCT Patent Publication No. WO2008111045 is incorporated by reference for all purposes as if fully set forth herein.

The condensation, decanting, and scrubbing steps may be performed substantially as described hereinabove. The wet (spent) $H_2SO_4$ stream may contain approximately 94% $H_2SO_4$, by weight, and may be advantageously utilized within the process for various possible applications, such as remaking HCl with salts and/or regenerating resins.

Preferably, the solubility of carbohydrates such as C6 sugars in the heat transfer liquid is less than 0.1%, preferably less than 0.05%, and more preferably, less than 0.01%.

As used herein in the specification and in the claims section that follows, the term "HCl content, by weight", "HCl concentration, by weight", and the like, with regard to an aqueous liquor, refers to an HCl concentration defined by the relationship:

$$C_{liq}=100 \cdot A/(A+W)$$

wherein:
$C_{liq}$ is the HCl concentration in the aqueous liquor, by weight, expressed in %;
A is a weight percent of HCl in the aqueous liquor, and
W is a weight percent of water in the aqueous liquor.

As used herein in the specification and in the claims section that follows, the term "HCl content, by weight", "HCl concentration, by weight", and the like, with regard to a vapor phase, refers to an HCl concentration defined by the relationship:

$$C_{vap}=100 \cdot A/(A+W)$$

wherein:
$C_{vap}$ is the vapor phase HCl concentration, by weight, expressed in %;
A is a weight percent of HCl in the vapor phase, and
W is a weight percent of water vapor in the vapor phase.

As used herein in the specification and in the claims section that follows, the term "sugar" may refer to a plurality of sugars, such as may typically be found in an aqueous hydrolyzate solution produced in the reaction of cellulose with fuming HCl.

As used herein in the specification and in the claims section that follows, the term "thermal mass", regarding a process stream, refers to a mass flowrate of the stream multiplied by the specific heat capacity of the stream, per unit mass, at or around the operating temperature of the stream.

Throughout this disclosure, various aspects of this invention can be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 10 should be considered to have specifically disclosed subranges such as from 1 to 2, from 1 to 5, from 1 to 8, from 3 to 4, from 3 to 8, from 3 to 10, etc., as well as individual numbers within that range, for example, 1, 2, 3, 4, 5, 6, 7, 8, 9, and 10. This applies regardless of the breadth of the range.

Similarly, the terms "at least", "exceeds", and the like, followed by a number (including a percent or fraction), should be considered to have specifically disclosed all the possible subranges above that number, as well as individual numerical values above that number. For example, the term "at least 75" should be considered to have specifically disclosed subranges such as 80 and above, 90 and above, etc, as well as individual numbers such as 85 and 95.

Similarly, the terms "less than", "below", and the like, followed by a number (including a percent or fraction), should be considered to have specifically disclosed all the possible subranges below that number, as well as individual numerical values below that number. For example, the term "below 75%" should be considered to have specifically disclosed subranges such as 70% and below, 60% and below, etc, as well as individual numbers such as 65% and 50%.

Whenever a numerical range is indicated herein, the range is meant to include any cited numeral (fractional or integral) within the indicated range. The phrase "ranging/ranges between" a first number and a second number and "within a range of" a first number to a second number, and the like, are used herein interchangeably and are meant to include the first and second indicated numbers and all the fractional and integral numerals therebetween.

It will be appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims. In addition, citation or identification of any reference in this application shall not be construed as an admission that such reference is available as prior art to the present invention.

What is claimed is:

1. A method for producing a concentrated HCl vapor from a super azeotropic aqueous solution of HCl, the method comprising the steps of:
   (a) introducing an aqueous feed to an evaporation chamber containing a mother liquor, said aqueous feed containing at least 10% sugar, on a weight basis, of sugar within said feed to sugar and water within said feed, and having an HCl concentration of at least 18%, by weight, said concentration defined by a relationship:

$$C_{liq}=100 \cdot A/(A+W)$$

wherein:
   $C_{liq}$ is said concentration by weight, expressed in %;
   A is a weight percent of HCl in said aqueous feed, and
   W is a weight percent of water in said aqueous feed;
   (b) directly contacting said mother liquor with a heat transfer fluid in a heat-laden state, to transfer heat from said fluid, whereby HCl is evaporated within said chamber, to produce the concentrated HCl vapor and to produce said mother liquor, said mother liquor including said heat transfer fluid in a heat-depleted state, with respect to said heat-laden state, and an HCl-depleted aqueous phase having a reduced concentration of HCl, with respect to said HCl concentration;
   (c) subjecting a first portion of said mother liquor to a liquid-liquid separation to produce a first aqueous liquid phase containing HCl, and a second liquid phase containing said heat transfer fluid in said heat-depleted state;
   (d) heating said heat transfer fluid in said heat-depleted state, to regenerate said heat transfer fluid in said heat-laden state, and
   (e) returning said heat transfer fluid in said heat-laden state to step (b),
   wherein associated with said evaporation chamber is a circulation loop, having a first end and a second end disposed in fluid communication with said evaporation chamber,
   wherein a second portion of said mother liquor, containing said HCl-depleted aqueous phase and said heat transfer fluid in said heat-depleted state, is circulated through said loop as a circulated mother liquor;
   and wherein said contacting of said mother liquor with said heat transfer fluid in said heat-laden state transpires within said circulation loop.

2. The method of claim 1, wherein said aqueous feed is introduced to said evaporation chamber via said loop.

3. The method of claim 1, wherein said heat transfer fluid in said heat-laden state includes a liquid heat transfer fluid, and said heat includes sensible heat from said liquid heat transfer fluid.

4. The method of claim 1, wherein said heat transfer fluid in said heat-laden state is introduced to said evaporation chamber via said loop.

5. The method of claim 1, further comprising the step of:
   (f) controlling a ratio of a flowrate of said circulated mother liquor to a flowrate of said heat transfer fluid in said heat-laden state to maintain a temperature within said loop below a pre-determined value.

6. The method of claim 1, further comprising the step of:
   (f) controlling a ratio of a flowrate of said circulated mother liquor to a flowrate of said heat transfer fluid in said heat-laden state to maintain a temperature within said loop below 80° C.

7. The method of claim 1, further comprising the step of:
   (f) controlling a ratio of a flowrate of said circulated mother liquor to a flowrate of said heat transfer fluid in said heat-laden state within a pre-determined range.

8. The method of claim 1, further comprising the step of:
   (f) controlling a ratio of a thermal mass of said circulated mother liquor to a thermal mass of said heat transfer fluid in said heat-laden state within a pre-determined range.

9. The method of claim 1, further comprising the step of:
   (f) scrubbing the concentrated HCl vapor to produce a substantially dry HCl vapor.

10. The method of claim 1, further comprising the step of:
(f) processing said first aqueous liquid phase to produce a sugar solution containing less than 1% HCl.

11. The method of claim 1, wherein a temperature of said heat transfer fluid in said heat-laden state exceeds 75° C., and wherein a temperature within said evaporation chamber is maintained below 75° C.

12. The method of claim 1, wherein said heat transfer fluid in said heat-laden state includes at least one mineral oil in which at least 85% of the hydrocarbons, by weight, have between 10 and 18 carbon atoms, said at least one mineral oil selected from the group consisting of alkane, cyclo-alkane, and aromatic mineral oils.

13. The method of claim 1, wherein said heat transfer fluid in said heat depleted state is heated, outside of said circulation loop, to produce said heat transfer fluid in said heat laden state.

14. The method of claim 13, wherein a temperature of said heat transfer fluid in said heat laden state is at least 10° C. above a degradation temperature of said mother liquor in said evaporation chamber.

15. The method of claim 13, wherein a temperature of said heat transfer fluid in said heat laden state is at least 20° C. above a degradation temperature of said mother liquor in said evaporation chamber.

* * * * *